(12) United States Patent
Liu et al.

(10) Patent No.: US 11,570,148 B2
(45) Date of Patent: Jan. 31, 2023

(54) METHOD AND APPARATUS FOR DEPLOYING SECURITY ACCESS CONTROL POLICY

(71) Applicant: HUAWEI CLOUD COMPUTING TECHNOLOGIES CO., LTD., Guizhou (CN)

(72) Inventors: Chunliang Liu, Beijing (CN); Haiqing Jia, Beijing (CN); Dou Sun, Mexico City (MX)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 170 days.

(21) Appl. No.: 15/899,233

(22) Filed: Feb. 19, 2018

(65) Prior Publication Data
US 2018/0191682 A1    Jul. 5, 2018

Related U.S. Application Data
(63) Continuation of application No. PCT/CN2016/073810, filed on Feb. 15, 2016.

(30) Foreign Application Priority Data
Aug. 19, 2015 (CN) .......................... 201510510681.0

(51) Int. Cl.
*H04L 29/06* (2006.01)
*H04L 9/40* (2022.01)
(Continued)

(52) U.S. Cl.
CPC ...... *H04L 63/0263* (2013.01); *G06F 9/45558* (2013.01); *G06F 21/604* (2013.01);
(Continued)

(58) Field of Classification Search
CPC ..... H04L 63/0263; H04L 63/10; H04L 63/20; H04L 41/0843; G06F 2009/45595
(Continued)

(56) References Cited

U.S. PATENT DOCUMENTS 6,408,336 B1 * 6/2002 Schneider ........... H04L 63/0218
709/229
6,477,665 B1 * 11/2002 Bowman-Amuah ... G06F 11/22
712/244
(Continued)

FOREIGN PATENT DOCUMENTS

| CN | 102025535 A | 4/2011 |
| CN | 103167041 A | 6/2013 |

(Continued)

OTHER PUBLICATIONS

Machine Translation and Abstract of Chinese Publication No. CN102025535, Apr. 20, 2011, 24 pages.
(Continued)

*Primary Examiner* — Venkat Perungavoor
*Assistant Examiner* — Peiliang Pan
(74) *Attorney, Agent, or Firm* — Conley Rose, P.C.

(57) ABSTRACT

A method and an apparatus are provided for deploying a security access control policy in the field of network security. The method, executed by a cloud management platform, includes: determining, according to an application creation instruction, an application template used for an application that needs to be created and a security profile corresponding to the application template; instructing a virtualization platform to create, according to the application template, a corresponding virtual machine for each application component in the application, and obtaining an IP address of each virtual machine created by the virtualization platform; generating a group of security access control policies corre-
(Continued)

sponding to the application according to the IP address of each virtual machine and by using the security profile; and delivering the group of security access control policies to a corresponding firewall. Therefore, a security access control policy is automatically deployed.

20 Claims, 10 Drawing Sheets

(51) Int. Cl.
| | | |
|---|---|---|
| *H04L 67/10* | (2022.01) | |
| *G06F 21/60* | (2013.01) | |
| *G06F 9/455* | (2018.01) | |
| *H04L 61/5014* | (2022.01) | |

(52) U.S. Cl.
CPC .......... *H04L 63/0209* (2013.01); *H04L 63/10* (2013.01); *H04L 63/105* (2013.01); *H04L 63/20* (2013.01); *H04L 67/10* (2013.01); *G06F 2009/45587* (2013.01); *G06F 2009/45595* (2013.01); *H04L 61/5014* (2022.05)

(58) Field of Classification Search
USPC ............................................................ 726/1
See application file for complete search history.

(56) References Cited

U.S. PATENT DOCUMENTS

| | | | | |
|---|---|---|---|---|
| 7,870,153 | B2* | 1/2011 | Croft ................... | G06F 3/1415 707/781 |
| 8,799,359 | B2* | 8/2014 | Stanev .................. | G06Q 10/06 709/203 |
| 8,805,951 | B1* | 8/2014 | Faibish ................. | G06F 9/5072 709/213 |
| 9,712,491 | B2* | 7/2017 | Burns ..................... | H04L 12/66 |
| 10,264,058 | B1* | 4/2019 | Lauinger ............. | H04L 12/4625 |
| 10,484,334 | B1* | 11/2019 | Lee ..................... | H04L 63/0245 |
| 2003/0058277 | A1* | 3/2003 | Bowman-Amuah ....................... G06F 16/289 715/765 |
| 2004/0083382 | A1* | 4/2004 | Markham ............. | H04L 63/102 726/1 |
| 2004/0143749 | A1* | 7/2004 | Tajalli .................. | G06F 21/316 726/23 |
| 2005/0138416 | A1* | 6/2005 | Qian ....................... | H04L 63/08 726/4 |
| 2005/0240558 | A1* | 10/2005 | Gil ........................ | G06F 16/972 |
| 2005/0283823 | A1* | 12/2005 | Okajo ..................... | H04L 63/12 726/1 |
| 2006/0041743 | A1* | 2/2006 | Della-Libera ........... | H04L 63/08 713/151 |
| 2006/0150145 | A1* | 7/2006 | Khandekar ............. | G06Q 40/04 717/106 |
| 2006/0259583 | A1* | 11/2006 | Matsuura .............. | H04L 61/256 709/218 |
| 2008/0066151 | A1* | 3/2008 | Thomsen .............. | G06F 21/604 726/1 |
| 2008/0126406 | A1* | 5/2008 | Endabetla ............ | G06Q 10/06 |
| 2010/0111529 | A1* | 5/2010 | Zeng ........................ | H04L 12/18 398/58 |
| 2011/0113236 | A1* | 5/2011 | Chenard ............. | H04L 63/0471 713/154 |
| 2011/0153722 | A1* | 6/2011 | Choudhary ......... | H04L 67/2814 709/203 |
| 2011/0153937 | A1* | 6/2011 | Annamalaisami ...... | H04L 69/16 711/118 |
| 2011/0277026 | A1* | 11/2011 | Agarwal ............. | H04L 63/0815 726/8 |
| 2011/0277027 | A1* | 11/2011 | Hayton ............... | H04L 63/0815 726/8 |
| 2012/0036220 | A1* | 2/2012 | Dare ...................... | H04L 67/04 709/217 |
| 2012/0036552 | A1* | 2/2012 | Dare ................... | H04L 41/0803 726/1 |
| 2012/0066670 | A1* | 3/2012 | McCarthy ............. | G06F 9/5072 717/169 |
| 2012/0143634 | A1* | 6/2012 | Beyda .................... | G06Q 10/06 705/4 |
| 2012/0232947 | A1* | 9/2012 | McLachlan ........... | G06F 16/289 705/7.23 |
| 2013/0019276 | A1* | 1/2013 | Biazetti ................. | H04L 63/102 726/1 |
| 2013/0019314 | A1* | 1/2013 | Ji .......................... | H04L 63/168 726/25 |
| 2013/0227352 | A1* | 8/2013 | Kumarasamy ...... | G06F 11/1461 714/47.1 |
| 2014/0082196 | A1* | 3/2014 | Harrison ............. | H04L 65/1069 709/225 |
| 2014/0109072 | A1* | 4/2014 | Lang ................... | G06F 9/45504 717/168 |
| 2014/0109078 | A1* | 4/2014 | Lang ........................ | G06F 8/52 717/172 |
| 2014/0181031 | A1* | 6/2014 | Kumarasamy ...... | G06F 16/2365 707/640 |
| 2015/0100946 | A1* | 4/2015 | Brunswig ........... | G06F 11/3688 717/124 |
| 2015/0278701 | A1* | 10/2015 | Danielsson ............. | H04L 67/10 706/47 |
| 2015/0317331 | A1* | 11/2015 | Thomas .................... | G06F 8/35 707/792 |
| 2015/0319252 | A1* | 11/2015 | Momchilov ............ | H04L 67/42 709/223 |
| 2015/0347542 | A1* | 12/2015 | Sullivan ............... | G06F 16/254 707/602 |
| 2015/0378685 | A1* | 12/2015 | Kaplinger ............. | G06F 16/957 717/104 |
| 2016/0048408 | A1* | 2/2016 | Madhu ................ | G06F 11/2097 718/1 |
| 2016/0055573 | A1* | 2/2016 | Chen .................. | G06Q 30/0641 705/26.41 |
| 2016/0087871 | A1* | 3/2016 | Dixon .................. | H04L 67/125 370/392 |
| 2016/0142483 | A1* | 5/2016 | Nallathambi ....... | G06F 11/1461 707/639 |
| 2016/0196324 | A1* | 7/2016 | Haviv .................... | G06F 16/27 707/626 |
| 2016/0337859 | A1* | 11/2016 | Pantus .................. | H04W 12/08 |
| 2017/0041296 | A1* | 2/2017 | Ford .................... | H04W 12/06 |
| 2019/0026035 | A1* | 1/2019 | Gokhale ............. | G06F 11/2092 |
| 2019/0259097 | A1* | 8/2019 | Raleigh ................ | H04M 15/68 |

FOREIGN PATENT DOCUMENTS

| | | |
|---|---|---|
| CN | 103916378 A | 7/2014 |
| CN | 104270467 A | 1/2015 |
| CN | 104580078 A | 4/2015 |
| CN | 104717181 A | 6/2015 |
| CN | 105100109 A | 11/2015 |
| CN | 105119952 A | 12/2015 |
| WO | 2012129409 A2 | 9/2012 |

OTHER PUBLICATIONS

Machine Translation and Abstract of Chinese Publication No. CN103167041, Jun. 19, 2013, 21 pages.
Machine Translation and Abstract of Chinese Publication No. CN103916378, Jul. 9, 2014, 21 pages.
Machine Translation and Abstract of Chinese Publication No. CN104270467, Jan. 7, 2015, 12 pages.
Machine Translation and Abstract of Chinese Publication No. CN104580078, Apr. 29, 2015, 17 pages.
Machine Translation and Abstract of Chinese Publication No. CN104717181, Jun. 17, 2015, 30 pages.
Machine Translation and Abstract of Chinese Publication No. CN105100109, Nov. 25, 2015, 42 pages.

(56) References Cited

OTHER PUBLICATIONS

Machine Translation and Abstract of Chinese Publication No. CN105119952, Dec. 2, 2015, 13 pages.
Foreign Communication From A Counterpart Application, Chinese Application No. 201510510681.0, Chinese Office Action dated Sep. 1, 2017, 7 pages.
Foreign Communication From A Counterpart Application, PCT Application No. PCT/CN2016/073810, English Translation of International Search Report dated May 13, 2016, 2 pages.
Foreign Communication From A Counterpart Application, PCT Application No. PCT/CN2016/073810, English Translation of Written Opinion dated May 13, 2016, 7 pages.

* cited by examiner

METHOD AND APPARATUS FOR DEPLOYING SECURITY ACCESS CONTROL POLICY

CROSS-REFERENCE TO RELATED APPLICATION

This application is a continuation of International Application No. PCT/CN2016/073810, filed on Feb. 15, 2016, which claims priority to Chinese Patent Application No. 201510510681.0, filed on Aug. 19, 2015. The disclosures of the aforementioned applications are hereby incorporated by reference in their entireties.

TECHNICAL FIELD

The present disclosure relates to the field of network security, and in particular, to a method and an apparatus for deploying a security access control policy.

BACKGROUND

A firewall is a network security system that is used to strengthen access control between networks, and prevent an external network user from illegally accessing an internal network to access an internal network resource. The firewall checks, according to a security access policy, a data packet that is transmitted between two or more networks, to determine whether communication between networks is allowed.

In an actual application process, a data center network is usually divided into several security zones by using the firewall. A security zone is a logical area. Same or similar security protection requirements exist in the area, and a security risk of data flowing in a same security zone is relatively low; however, due to different security levels, access between security zones is usually prohibited by default. However, because there exists unavoidable interaction between security zones, a security access control policy between the security zones needs to be configured, so as to allow normal access between the security zones.

FIG. 1 is a schematic diagram of division of a data center network and an access relationship between parts. An application component architecture of a common web application is used as an example for description. A typical web application includes a three-layer architecture: a web server, an application server (App Server), and a database server (DB Server). Specifically, the web server opens a web service port to a web browser, that is, the web browser may access a resource of the web server. The App server opens an application (App) service port to the web server, that is, the web server may access a resource of the App server. The DB server opens a database (DB) service port to the App server, that is, the App server may access a resource of the DB server. Only an App server in the application is allowed to access the DB, and another App server is not allowed to access the DB. Referring to FIG. 2, an App server 1 cannot access a DB in a DB server 2. Therefore, a security access control policy needs to be set for each application component.

At present, when the data center network is deployed, all the security access control policies need to be manually set. A user first deploys an application on a cloud management platform, that is, creates an application component and a corresponding virtual machine; and then obtains an IP address of a virtual machine corresponding to each application component in the application; and finally sets, on the firewall according to the obtained IP address of each virtual machine, a security access control policy corresponding to each application component. Generally, the security access control policy needs to be manually set on the firewall by an administrator; therefore, configuration work is relatively labor-consuming, a configuration process is relatively time-consuming, and there is a possibility of a manual configuration error.

SUMMARY

Embodiments of the present disclosure provide a method and an apparatus for deploying a security access control policy, to resolve prior-art problems that there is a possibility of a manual configuration error, and configuration work is labor- and time-consuming, because a security access control policy needs to be manually configured.

Specific technical solutions provided in the embodiments of the present disclosure are as follows:

According to a first aspect, a method is provided for deploying a security access control policy. The method may include: determining, by a cloud management platform according to an application creation instruction, an application template used for an application that needs to be created and a security profile corresponding to the application template; instructing, by the cloud management platform, a virtualization platform to create, according to the application template, a corresponding virtual machine for each application component in the application, and obtaining an IP address of each virtual machine created by the virtualization platform; generating, by the cloud management platform, a group of security access control policies corresponding to the application according to the IP address of each virtual machine and by using the security profile; and delivering, by the cloud management platform, the group of security access control policies to a corresponding firewall.

According to a second aspect, a method is provided for deploying a security access control policy. When determining, according to an application migration instruction, that a network environment in which an application is located changes, a cloud management platform instructs a virtualization platform to create, according to an application template corresponding to the application, a new corresponding virtual machine for each application component in the application, and obtaining an IP address of each new virtual machine. The cloud management platform synchronizes data in an original virtual machine corresponding to each application component in the application to the new corresponding virtual machine. The cloud management platform deletes the original virtual machine corresponding to each application component in the application, and instructs a firewall to delete the group of security access control policies originally configured for the application. The cloud management platform generates a group of new security access control policies according to the IP address of each new virtual machine corresponding to each application component and by using a security profile corresponding to the application. The cloud management platform delivers the group of new security access control policies to a corresponding firewall.

According to a third aspect, an apparatus is provided for deploying a security access control policy. The apparatus comprises at least one processor and at least one memory, and wherein the at least one memory having a plurality of instructions stored thereon, that when executed by the at least one processor, cause the at least one processor to: determine, according to an application creation instruction, an application template used for an application that needs to be created and a security profile corresponding to the application template; instruct a virtualization platform to create, according to the application template, a virtual machine for each application component in the application, and obtain an IP address of each virtual machine created by the virtualization platform; generate a group of security access control policies corresponding to the application according to the IP address of each virtual machine and by using the security profile; and deliver the group of security access control policies to a firewall.

According to a fourth aspect, an apparatus is provided for deploying a security access control policy. The apparatus may include: at least one processor and at least one memory. The at least one memory having a plurality of instructions stored thereon, that when executed by the at least one processor, cause the at least one processor to determine, according to an application creation instruction, an application template used for an application that needs to be created and a security profile corresponding to the application template; instruct a virtualization platform to create, according to the application template, a corresponding virtual machine for each application component in the application, and obtain an IP address of each virtual machine created by the virtualization platform; generate a group of security access control policies corresponding to the application according to the IP address of each virtual machine and by using the security profile; and deliver the group of security access control policies to a corresponding firewall.

DETAILED DESCRIPTIONS

To make the objectives, technical solutions, and advantages of the present disclosure clearer, the following further describes the present disclosure in detail with reference to the accompanying drawings.

Embodiments of the present disclosure provide a method and an apparatus for deploying a security access control policy, to resolve prior-art problems that there is a possibility of a manual configuration error, and configuration work is labor- and time-consuming, because a security access control policy needs to be manually configured. The method and the apparatus are based on a same disclosure conception, and principles of resolving a problem by the method and the apparatus are similar; therefore, cross reference may be made between implementations of the apparatus and the method. Repeated description is not further provided.

At present, when a data center network is deployed, an entire system mainly includes three parts: a cloud management platform, a virtualization platform, and a firewall. A user first deploys an application that needs to be created on the cloud management platform, then creates a virtual machine that is corresponding to an application component of the application on the virtualization platform, and finally generates a security access control policy according to an obtained IP address of a virtual machine corresponding to each application component in the application, and sets a security access control policy that is corresponding to each application component on the firewall.

It may be learned that an application includes multiple application components, and each application component is corresponding to one or more virtual machines. One security access control policy is generated for an IP address of a virtual machine corresponding to each application component. It may be learned that the security access control policy generated for each IP address is configured for the application.

The present disclosure provides a method and an apparatus in which a corresponding security access application policy is automatically generated and deployed for any application.

The following describes implementations of the present disclosure in detail with reference to the accompanying drawings.

Figure 1:
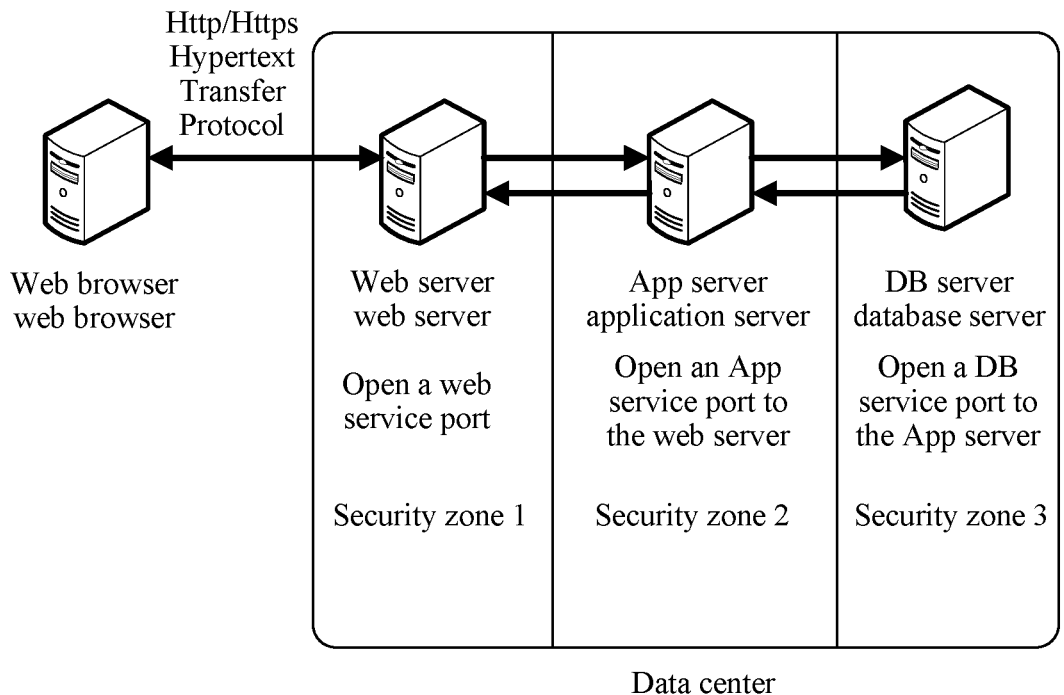
FIG. 1 is a schematic diagram of division of a data center network and an access relationship between parts according to a background of the present disclosure.
Figure 2:
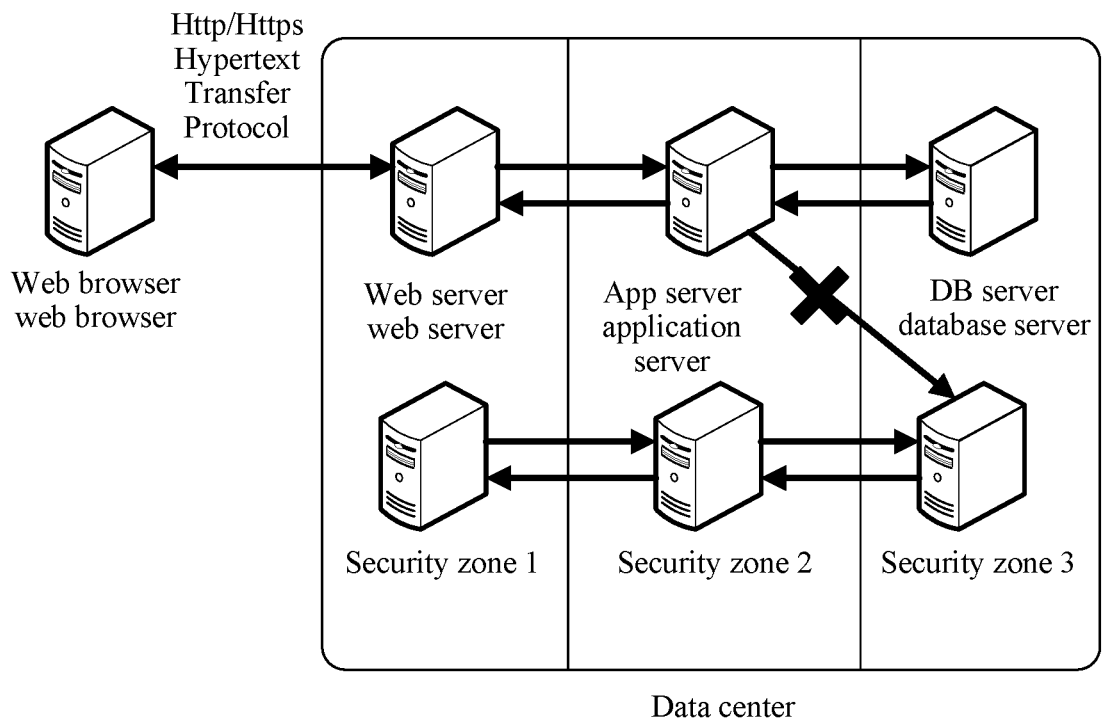
FIG. 2 is a schematic diagram of an access relationship between parts in a data center network according to a background of the present disclosure.
Figure 3:
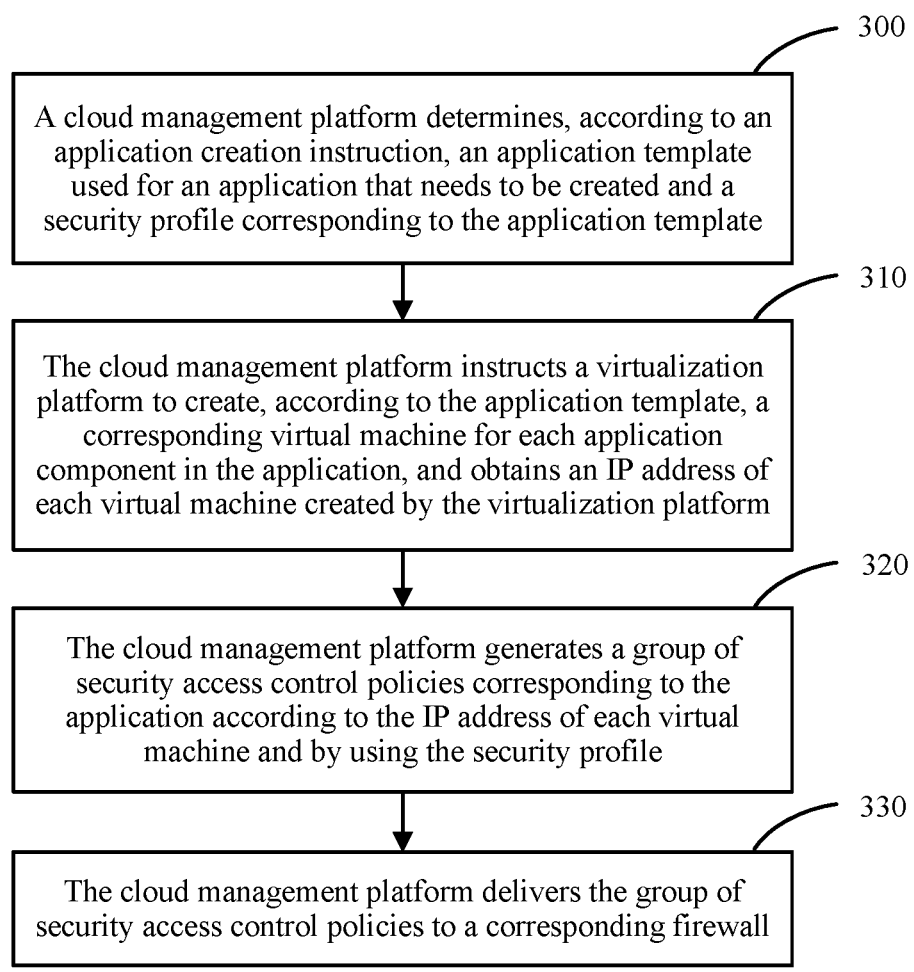
FIG. 3 is an overview flowchart of deploying a security access control policy according to an aspect of the present disclosure.

FIG. 3 is an overview flowchart of deploying a security access control policy according to an aspect of the present disclosure, and a specific process of deploying a security access control policy in the present disclosure includes the following steps.

according to a preset security parameter, where the security profile includes at least one security access control policy template.

For example, for an application template A, the application template A includes three application components, and the three application components are respectively a web server, an App server, and a DB server.

The application template A is set with a corresponding security profile, as shown in Table 1.

TABLE 1

| Source security zone/ Address | Destination security zone/ Address | Cluster listening address | Source port | Destination port | Protocol | Policy | Description |
|---|---|---|---|---|---|---|---|
| App server | DB server | | Any | 1521 | http | Allowed | xxx |
| Web server | App server | | Any | 8080 | http | Allowed | xxx |
| Any | Web server | 192.168.x.x | Any | 80 | http | Allowed | xxx |

Step 300: A cloud management platform determines, according to an application creation instruction, an application template used for an application that needs to be created and a security profile corresponding to the application template.

The user may send the application creation instruction to the cloud management platform according to a requirement of the user, and the application creation instruction may include various parameters for the application that needs to be created, for example, a type of the application component, a quantity corresponding to the application component, corresponding software installed in the virtual machine, a port number corresponding to an application component, a specification of the virtual machine, network information of the virtual machine, and security access control policy configuration information.

Specifically, each application component implements a specific function, all the application components cooperate with each other to jointly form a complete application program, and each application component is corresponding to one virtual machine.

Before the cloud management platform determines, according to the application creation instruction, the application template used for the application that needs to be created and the security profile corresponding to the application template, the process further includes: establishing the application template that is required for creating an application and the corresponding security profile.

Here, the cloud management platform generates at least one application template according to a preset application component configuration parameter.

For example, an administrator generates, according to the preset application component configuration parameter, an application template including three application components, and the three application components are respectively a web server, an App server, and a DB server.

Further, the cloud management platform generates a corresponding security profile for any application template Table 1 includes three security access control policy templates, and each security access control policy template is set according to a preset security parameter.

As shown in Table 1, a first security access control policy template is used as an example, the source security zone is the App server, the destination security zone is the DB server, a port number of the source port is any (any), a port number of the destination port is 1521, the protocol is http, and the policy is "allowed", a column of the cluster listening address is blank, and a column of other description content may be filled according to a requirement, so that configuration of the security access control policy template is completed. When the column of the cluster listening address is filled with a subsequently-obtained IP address of the DB server, the security access control policy is completed, and the security access control policy and another generated security access control policy are delivered together to a corresponding firewall. Therefore, the security access control policy template is first generated according to the preset security parameter, so that efficiency of deploying a security access control policy is greatly improved.

Configuration processes of the application template and the security profile corresponding to the application template need to be completed by the administrator by logging in to the cloud management platform.

In addition, after the cloud management platform determines, according to the application creation instruction, the application template used for the application that needs to be created and the security profile corresponding to the application template, the administrator may modify the determined security profile on the cloud management platform according to security configuration information carried in the application creation instruction, and use a modified security profile as a security profile for creating the application.

TABLE 2

| Source security zone/ Address | Destination security zone/ Address | Cluster listening address | Source port | Destination port | Protocol | Policy | Description |
|---|---|---|---|---|---|---|---|
| App server | DB server | | Any | 3306 | http | Allowed | xxx |
| Web server | App server | | Any | 8080 | http | Allowed | xxx |
| Any | Web server | 192.168.xx | Any | 80 | http | Allowed | xxx |

For example, as shown in Table 1, a destination port number corresponding to the DB server is 1521. In this case, according to security configuration information carried in an application creation instruction of a user 1, a destination port number corresponding to the DB server is 3306. A destination port number corresponding to the DB server in the security profile is modified, as shown in Table 2, and a modified security profile is used as a final security profile.

For another example, it is assumed that the application template A includes three application components, and the three application components are respectively a web server, an App server, and a DB server; however, a security profile A corresponding to the application template A includes only two security access control policy templates. In this case, according to security configuration information carried in the application creation instruction of a user 2, a security access control policy template is added, and a modified security profile is used as a final security profile.

Step 310: The cloud management platform instructs a virtualization platform to create, according to the application template, a corresponding virtual machine for each application component in the application, and obtains an IP address of each virtual machine created by the virtualization platform.

Here, the cloud management platform may specify an IP address for one or more created virtual machines.

Alternatively, the virtual machine obtains an IP address of the virtual machine from a DHCP server by using the DHCP protocol, and then the cloud management platform obtains, from the virtual machine, the IP address that is allocated by the DHCP server to each virtual machine.

Step 320: The cloud management platform generates a group of security access control policies corresponding to the application according to the IP address of each virtual machine and by using the security profile.

Figure 4:
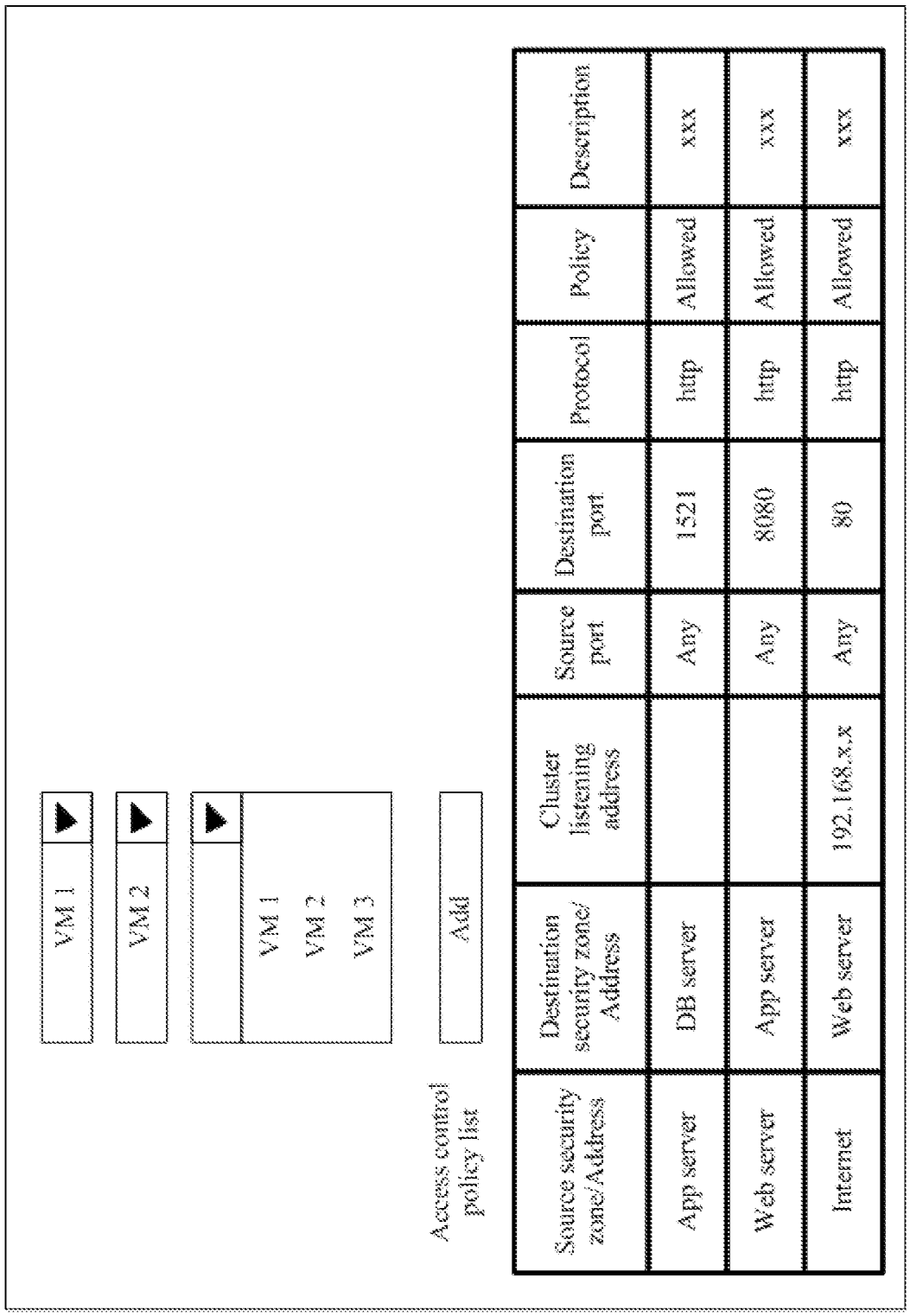
FIG. 4 is a schematic diagram of generating a security access control policy according to an aspect of the present disclosure.

Referring to FIG. 4, a corresponding virtual machine is determined for each security access control policy template, and the group of security access control policies corresponding to the application is generated according to the obtained IP address of each virtual machine and by using the security profile corresponding to the application.

In FIG. 4, a DB server is corresponding to a virtual machine 1 (VM 1), and an App server is corresponding to a virtual machine 2 (VM 2). Determining of the virtual machine corresponding to each application component may be completed when a security profile corresponding to an application template is configured. In this case, for example, the group of security access control policies is generated by directly using a corresponding security access control policy template and according to the obtained IP address of each virtual machine, where the column of the cluster listening address in Table 1 is filled with the obtained IP address.

Step 330: The cloud management platform delivers the group of security access control policies to a corresponding firewall.

The firewall performs security access control on the application according to a collected group of security access control policies for the application.

For example, for a first row of Table 1, the column of the cluster listening address is filled with an IP address of a virtual machine corresponding to the DB server, a security access control policy is generated, and the security access control policy and another security access control policy are delivered together to a corresponding firewall. Therefore, when the APP server needs to access the DB server, the DB server may open, according to the security access control policy generated in the first row of Table 1, a port 1521 to the APP server for accessing, and the App server cannot perform accessing by using another port.

In addition, for any application, at least two cases in which a security access control policy needs to be adjusted are further included in the following.

Adjustment of a security access control policy may occur in a creation process of an application, or may occur in a use process of an application after the application is created.

An application A is used as an example in the following, to describe in detail a case in which a security access control policy needs to be adjusted for the application A.

A first case:

When determining, according to a flexible policy of the application A carried in the application creation instruction, that an application component of a first type included in the application A meets a scale-out condition in the flexible policy, the cloud management platform instructs the virtualization platform to add a new virtual machine corresponding to the application component of a first type, and obtains an IP address of the virtual machine corresponding to the newly-added application component.

Here, the application component of a first type herein may be any one of a web server, an App server, or a DB server. The flexible policy includes a flexible policy of an application component of at least one type. In addition, the transversely flexible policy herein usually means that when access traffic of the application component of a first type reaches a first threshold, a new application component of a first type is added. Because an increase of the access traffic of the application component of a first type results in poor performance of the application component of a first type, in this case, a new application component of a first type needs to be added to meet a use requirement.

When determining that the application component of a first type has a corresponding security access control policy, the cloud management platform generates a security access control policy for the newly-added application component according to the IP address of the virtual machine corresponding to the newly-added application component and by using a security access control policy template corresponding to the application component of a first type in the security profile.

The cloud management platform delivers the corresponding security access control policy that is configured for the newly-added application component to a corresponding firewall.

The scale-out condition means that when a preset parameter of the application component of a first type in the application reaches a first threshold, a new application component of a first type is added.

A second case:

When determining, according to the flexible policy of the application A carried in the application creation instruction, that the application component of a first type included in the application A meets a scale-in condition in the flexible policy, the cloud management platform instructs the virtualization platform to delete a virtual machine corresponding to any application component of a first type.

When determining that any application component of a first type has a corresponding security access control policy, the cloud management platform instructs the firewall to delete the security access control policy corresponding to any application component of a first type.

The scale-in condition means that when a preset parameter of the application component of a first type in the application is less than a second threshold, any application component of a first type is deleted.

Generally, when a network environment in which an application is located changes, for example, an application is migrated, a security access control policy on a firewall cannot be accordingly adjusted in a timely manner, and a security access control policy of the migrated application needs to be manually adjusted. This causes a relatively long delay, and may result in a security problem.

In the present disclosure, after the cloud management platform invokes a firewall interface, and delivers the group of security access control policies to the corresponding firewall, if determining that a network environment in which an application is located changes, the cloud management platform may adjust the security access control policy of the application in a timely manner.

An application A is still used as an example in the following, to describe a resetting process of a security access control policy of the application A when the application A is migrated.

When determining, according to an application migration instruction, that a network environment in which the application A is located changes, the cloud management platform instructs a virtualization platform interface to create, according to the application template, a new corresponding virtual machine for each application component in the application A, and obtains an IP address of each new virtual machine.

A method for obtaining the IP address of each new virtual machine herein is the same as the method for obtaining the IP address of the virtual machine mentioned above.

The cloud management platform synchronizes data in an original virtual machine corresponding to each application component in the application A to the new corresponding virtual machine, deletes an original virtual machine corresponding to each application component in the application A, and instructs the firewall to delete the group of security access control policies originally configured for the application A.

The cloud management platform generates a group of new security access control policies according to the IP address of the new virtual machine corresponding to each application component and by using the security profile.

The cloud management platform invokes a firewall interface, and delivers the group of new security access control policies to a corresponding firewall.

It should be noted that the corresponding firewall herein to which the new security access control policy is delivered may be the same as the original firewall, or may be different from the original firewall, and whether firewalls are the same may be determined according to the application migration instruction.

Generally, when an application is migrated, a security access control policy of the application cannot be adjusted in a timely manner, and needs to be manually adjusted. However, according to the method provided in the present disclosure, the cloud management platform may adjust the security access control policy in a timely manner, and effectively control application security access.

The following uses examples to describe in detail the method in the present disclosure.

Figure 5:
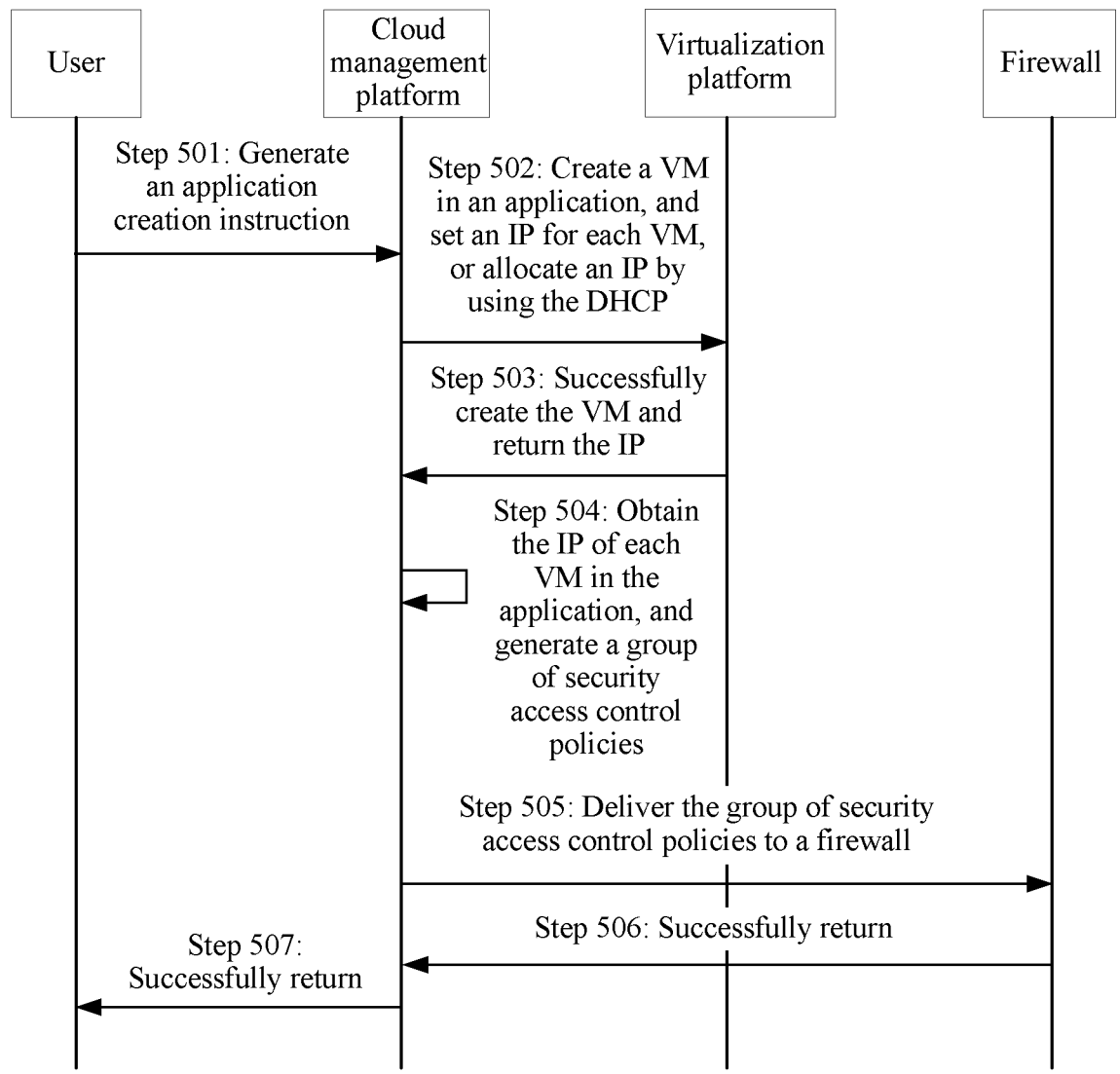
FIG. 5 is a specific flowchart of deploying a security access control policy according to an aspect of the present disclosure.

Referring to FIG. 5, FIG. 5 is a specific flowchart of deploying a security access control policy.

Step 501: A user determines an application template that is required for creating an application and a corresponding security profile, generates an application creation instruction according to a determining result, and sends the application creation instruction to a cloud management platform by using a client.

Step 502: The cloud management platform invokes a virtualization platform interface according to the application creation instruction and the determined application template, creates a virtual machine VM in the application, and sets an IP address for each created VM, or allocates an IP address to each created virtual machine by using the DHCP.

Step 503: The virtualization platform sends an acknowledgment indication to the cloud management platform, to indicate that the VM is created successfully, and returns the IP address of each VM.

Step 504: The cloud management platform generates a group of security access control policies according to the obtained IP address of each VM and by using the security profile.

Step 505: The cloud management platform invokes a firewall interface, and delivers the group of security access control policies to a corresponding firewall.

Step 506: The firewall returns a security access control policy configuration success message to the cloud management platform.

Step 507: The cloud management platform returns an application creation success message to the user.

Figure 6:
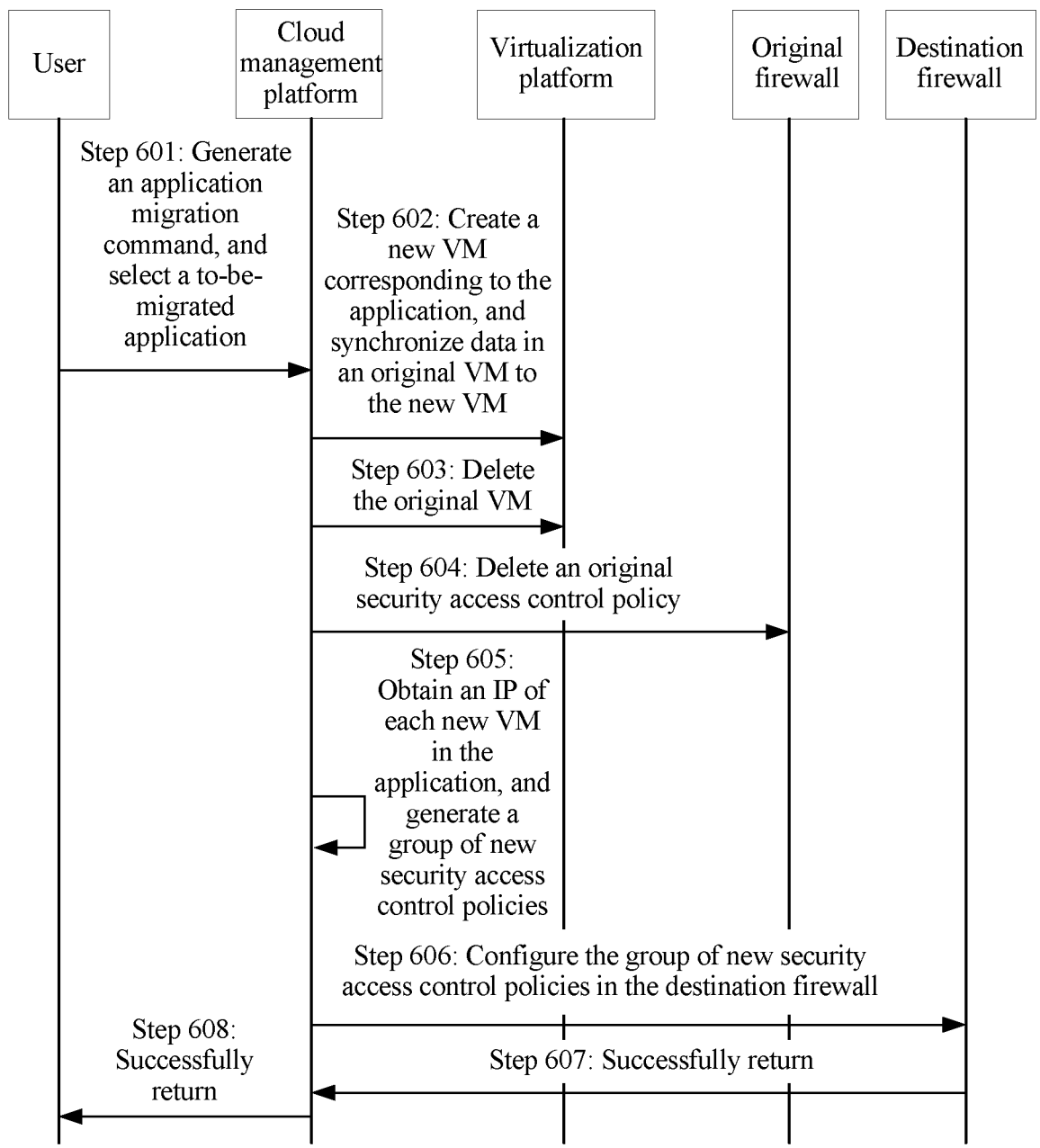
FIG. 6 is a specific flowchart of resetting, by a cloud management platform, a security access control policy for migrating an application according to an aspect of the present disclosure.

Referring to FIG. 6, FIG. 6 is a specific flowchart of resetting, by a cloud management platform, a security access control policy for migrating an application when the application is migrated.

Step 601: A user selects an application that needs to be migrated, selects a destination network and a destination firewall to which the application needs to be migrated, and generates an application migration command according to a selection result; and the user sends the application migration command to a cloud management platform by using a client.

The destination network usually is another network segment, and after the network segment changes, the destination network may be in another firewall.

Step 602: The cloud management platform invokes a virtualization platform interface, creates a new corresponding virtual machine for each application component in an application by using an application template, obtains an IP address of each new virtual machine, and synchronizes data in an original virtual machine corresponding to each application component in the application to the new corresponding virtual machine.

Step 603: The cloud management platform invokes the virtualization platform interface, and deletes the original virtual machine corresponding to each application component in the application.

Step 604: The cloud management platform invokes a firewall interface, and deletes a group of security access control policies originally configured for the application.

Step 605: The cloud management platform obtains an IP address of each new virtual machine, and generates a group of new security access control policies by using a security profile.

Step 606: The cloud management platform invokes the firewall interface to configure the group of new security access control policies in the destination firewall.

Step 607: The firewall returns a security access control policy configuration success message to the cloud management platform.

Step 608: The cloud management platform returns an application migration success message to the user.

Figure 7:
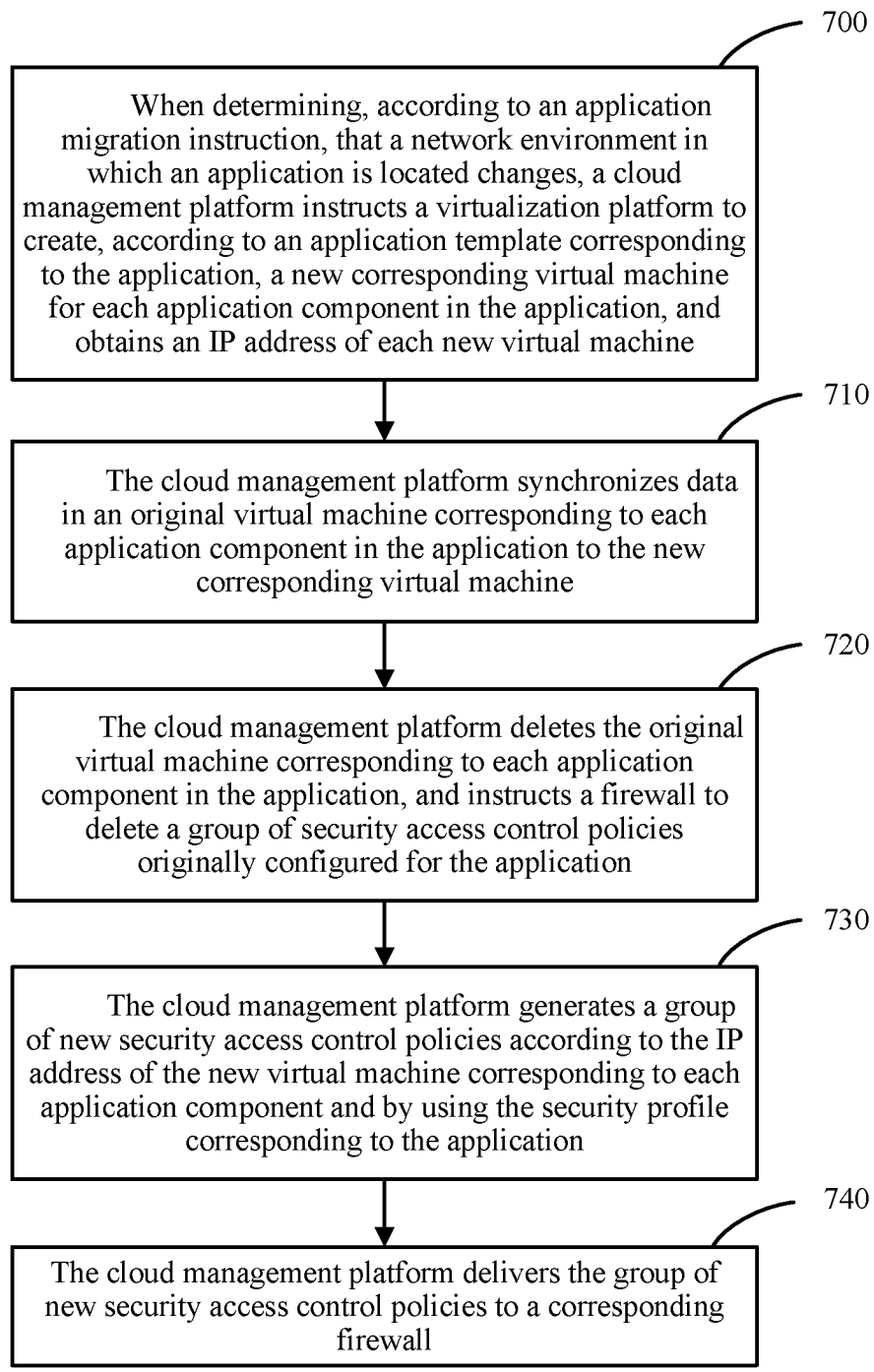
FIG. 7 is an overview flowchart of deploying a security access control policy when an application is migrated according to an aspect of the present disclosure.

Referring to FIG. 7, FIG. 7 is an overview flowchart of deploying a security access control policy when an application is migrated according to an aspect of the present disclosure, and a specific process includes the following steps.

Step 700: When determining, according to an application migration instruction, that a network environment in which an application is located changes, a cloud management platform instructs a virtualization platform to create, according to an application template corresponding to the application, a new corresponding virtual machine for each application component in the application, and obtains an IP address of each new virtual machine.

Step 710: The cloud management platform synchronizes data in an original virtual machine corresponding to each application component in the application to the new corresponding virtual machine.

Step 720: The cloud management platform deletes the original virtual machine corresponding to each application component in the application, and instructs a firewall to delete a group of security access control policies originally configured for the application.

Step 730: The cloud management platform generates a group of new security access control policies according to the IP address of the new virtual machine corresponding to each application component and by using the security profile corresponding to the application.

Step 740: The cloud management platform delivers the group of new security access control policies to a corresponding firewall.

Cross reference may be made between the method for deploying a security access control policy when an application is migrated and the application migration and Embodiment 2 mentioned above.

The application and the corresponding security access control policy herein may be generated by using the method in steps 300 to 330 of the application, or the application and the corresponding security access control policy may be manually generated. The two cases herein are merely examples. Persons skilled in the art may perform various modifications and variations on embodiments of the present disclosure without departing from the spirit and scope of the embodiments of the present disclosure.

Optionally, when the cloud management platform determines, according to the application migration instruction, that the network environment in which the application is located changes, the method further includes:

modifying, by the cloud management platform, the security profile corresponding to the application according to security configuration information carried in the application migration instruction, and using a modified security profile as a security profile corresponding to the application.

Figure 8:
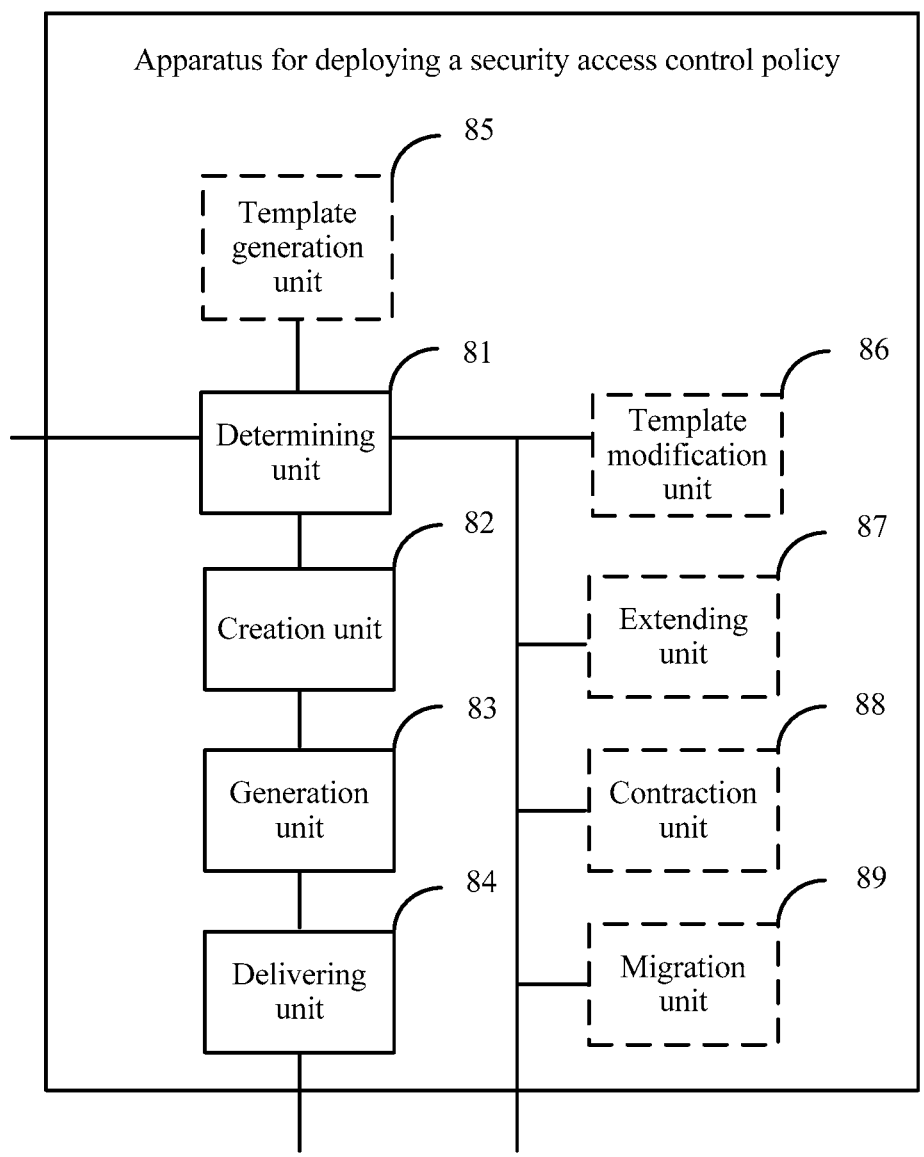
FIG. 8 is a schematic structural diagram of an apparatus for deploying a security access control policy according to an aspect of the present disclosure.

Referring to FIG. 8, FIG. 8 is an apparatus for deploying a security access control policy, including:

a determining unit 81, configured to determine, according to an application creation instruction, an application template used for an application that needs to be created and a security profile corresponding to the application template;

a creation unit 82, configured to: instruct a virtualization platform to create, according to the application template determined by the determining unit, a corresponding virtual machine for each application component in the application, and obtain an IP address of each virtual machine created by the virtualization platform;

a generation unit 83, configured to generate a group of security access control policies corresponding to the application according to the IP address of each virtual machine obtained by the creation unit and by using the security profile determined by the determining unit; and a delivering unit 84, configured to deliver the group of security access control policies that are generated by the generation unit to a corresponding firewall.

Optionally, before the determining unit 81 determines, according to the application creation instruction, the application template used for the application that needs to be created and the security profile corresponding to the application template, the apparatus further includes:

a template generation unit 85, configured to: generate at least one application template according to a preset application component configuration parameter, and generate a corresponding security profile for any application template according to a preset security parameter, where the security profile includes at least one security access control policy template.

Optionally, after the determining unit 81 determines, according to the application creation instruction, the application template used for the application that needs to be created and the security profile corresponding to the application template, the apparatus further includes:

a template modification unit 86, configured to: modify the determined security profile according to security configuration information carried in the application creation instruction, and use a modified security profile as a security profile for creating the application.

Optionally, the apparatus further includes:

an extending unit 87, configured to: when determining, according to a flexible policy of the application carried in the application creation instruction, that an application component of a first type included in the application meets a scale-out condition in the flexible policy, instruct the virtualization platform to add a new virtual machine corresponding to the application component of a first type, and obtain an IP address of the virtual machine corresponding to the newly-added application component;

when determining that the application component of a first type has a corresponding security access control policy, generate a security access control policy for the newly-added application component according to the IP address of the virtual machine corresponding to the newly-added application component and by using a security access control policy template corresponding to the application component of a first type in the security profile; and deliver the corresponding security access control policy that is configured for the newly-added application component to a corresponding firewall.

The scale-out condition means that when a preset parameter of the application component of a first type in the application reaches a first threshold, a new application component of a first type is added.

Optionally, the apparatus further includes:

a contraction unit 88, configured to: when determining, according to the flexible policy of the application carried in the application creation instruction, that the application component of a first type included in the application meets a scale-in condition in the flexible policy, instruct the virtualization platform to delete a virtual machine corresponding to any application component of a first type; and when determining that any application component of a first type has a corresponding security access control policy, instruct the firewall to delete the security access control policy corresponding to any application component of a first type.

The scale-in condition means that when a preset parameter of the application component of a first type in the application is less than a second threshold, any application component of a first type is deleted.

Optionally, after the delivering unit delivers the group of security access control policies that are generated by the generation unit to the corresponding firewall, the apparatus further includes a migration unit 89.

Figure 9:
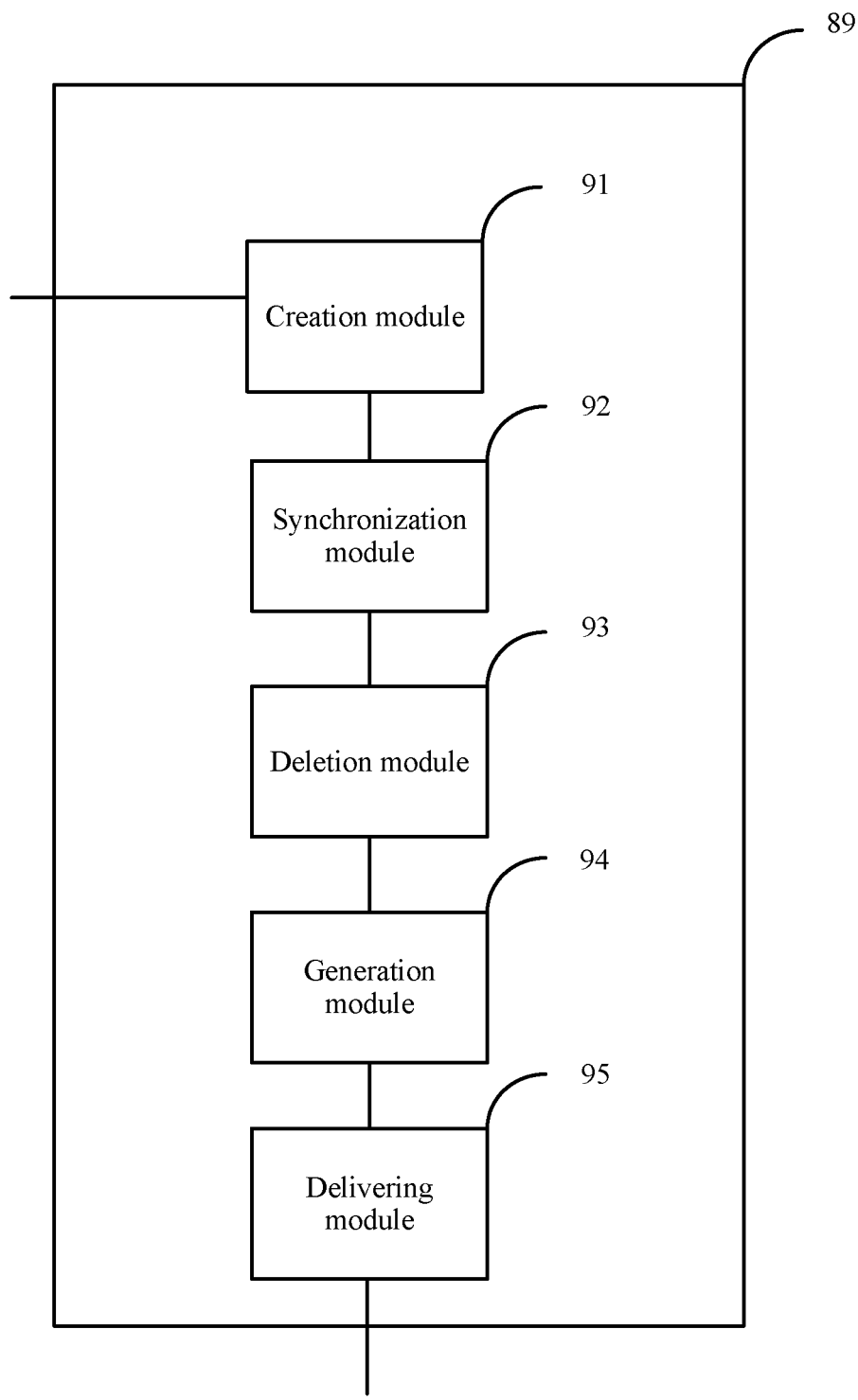
FIG. 9 is a schematic structural diagram of a migration unit according to an aspect of the present disclosure.

Referring to FIG. 9, the migration unit 89 includes:

a creation module 91, configured to: when determining, according to an application migration instruction, that a network environment in which the application is located changes, instruct the virtualization platform to create, according to the application template, a new corresponding virtual machine for each application component in the application, and obtain an IP address of each new virtual machine;

a synchronization module 92, configured to synchronize data in an original virtual machine corresponding to each application component in the application to the new corresponding virtual machine;

a deletion module 93, configured to: delete the original virtual machine corresponding to each application component in the application, and instruct a firewall to delete the group of security access control policies originally configured for the application;

a generation module 94, configured to generate a group of new security access control policies according to the IP address of the new virtual machine corresponding to each application component and by using the security profile; and a delivering module 95, configured to deliver the group of new security access control policies to a corresponding firewall.

Figure 10:
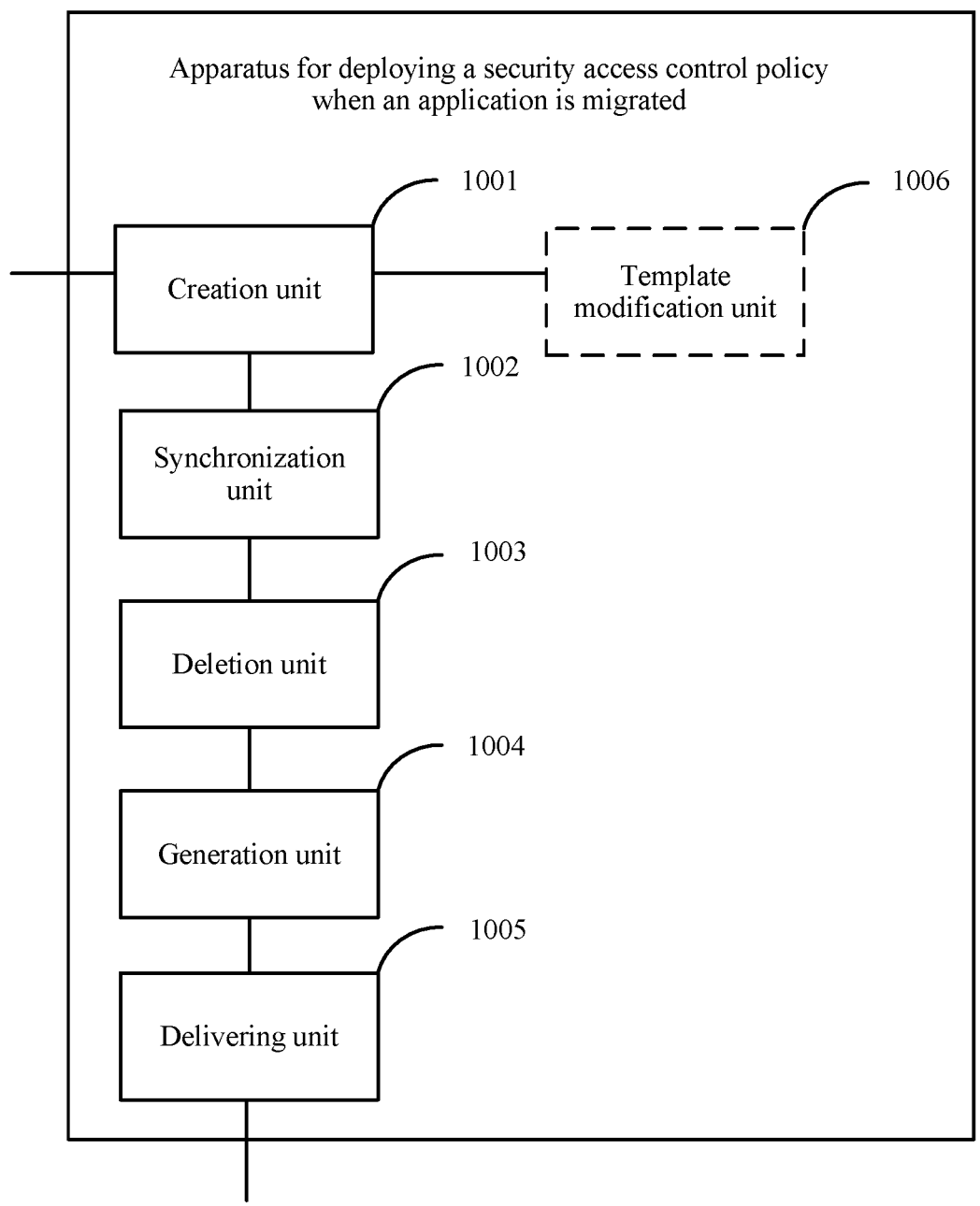
FIG. 10 is a schematic structural diagram of an apparatus for deploying a security access control policy when an application is migrated according to an aspect of the present disclosure.

Referring to FIG. 10, FIG. 10 is an apparatus for deploying a security access control policy, including:

a creation unit 1001, configured to: when determining, according to an application migration instruction, that a network environment in which an application is located changes, instruct a virtualization platform to create, according to an application template corresponding to the application, a new corresponding virtual machine for each application component in the application, and obtain an IP address of each new virtual machine;

a synchronization unit 1002, configured to synchronize data in an original virtual machine corresponding to each application component in the application to the new corresponding virtual machine;

a deletion unit 1003, configured to: delete the original virtual machine corresponding to each application component in the application, and instruct a firewall to delete the group of security access control policies originally configured for the application;

a generation unit 1004, configured to generate a group of new security access control policies according to the IP address of the new virtual machine corresponding to each application component and by using the security profile corresponding to the application; and a delivering unit 1005, configured to deliver the group of new security access control policies to a corresponding firewall.

Optionally, when determining, according to the application migration instruction, that the network environment in which the application is located changes, the apparatus further includes:

a template modification unit 1006, configured to: modify the security profile corresponding to the application according to security configuration information carried in the application migration instruction, and use a modified security profile as a security profile corresponding to the application.

It should be noted that division of modules in the embodiments of the present disclosure is an example, and is merely logical function division. There may be another division manner in actual implementation. In addition, functional modules in the embodiments of this application may be integrated into one processing module, or each module may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 11:
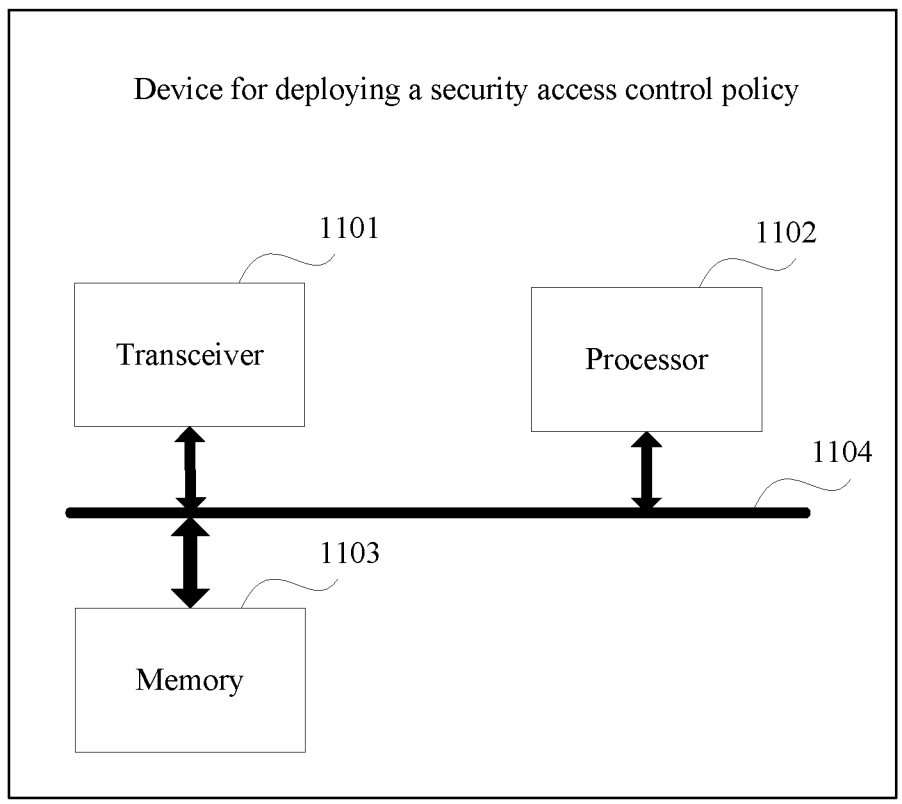
FIG. 11 is a schematic structural diagram of a device for deploying a security access control policy according to an aspect of the present disclosure.

An aspect of the present disclosure further provides a device for deploying a security access control policy. As shown in FIG. 11, FIG. 11 is a schematic structural diagram of a device for deploying a security access control policy according to an aspect of the present disclosure. The device includes a transceiver 1101, a processor 1102, and a memory 1103. The transceiver 1101, the processor 1102, and the memory 1103 are connected to each other. This aspect of the present disclosure imposes no limitation on a specific connection medium between the parts. In this aspect of the present disclosure, in FIG. 11, the memory 1103, the processor 1102, and the transceiver 1101 are connected by using a bus 1104, and the bus is represented by a bold line in FIG. 11. A connection manner between other parts is merely an example for description, and does not impose a limitation. The bus may be classified into an address bus, a data bus, a control bus, and the like. For ease of denotation, the bus 1104 is represented by using only one thick line in FIG. 11. However, it does not mean that there is only one bus or only one type of bus.

In this aspect of the present disclosure, the processor 1102 is configured to determine, according to an application creation instruction, an application template used for an application that needs to be created and a security profile corresponding to the application template.

The transceiver 1101 is configured to: instruct a virtualization platform to create, according to the application template, a corresponding virtual machine for each application component in the application, and obtain an IP address of each virtual machine created by the virtualization platform.

The processor 1102 generates a group of security access control policies corresponding to the application according to the IP address of each virtual machine and by using the security profile.

The transceiver 1101 is configured to deliver the group of security access control policies to a corresponding firewall.

The memory 1103 in this aspect of the present disclosure is configured to store program code executed by the processor 1102, and may be a volatile memory, for example, a random-access memory (RAM); or the memory 1103 may be a non-volatile memory, for example, a read-only memory (ROM), a flash memory, a hard disk drive (HDD), or a solid-state drive (SSD); or the memory 1103 may be any other medium that can be used to carry or store expected program code in an instruction or data structure form and can be accessed by a computer; however, the memory 1103 is not limited thereto. The memory 1103 may be a combination of the memories.

The processor 1102 in this aspect of the present disclosure may be a central processing unit (CPU).

An aspect of the present disclosure provides a method for deploying a security access control policy, and the method includes: determining, by a cloud management platform according to an application creation instruction, an application template used for an application that needs to be created and a security profile corresponding to the application template. Because a pre-configured application template and the security profile corresponding to the application template are used for deploying an application, efficiency of deploying an application is greatly improved. The cloud management platform instructs the virtualization platform to create, according to the application template, the corresponding virtual machine for each application component in the application, and obtains the IP address of each virtual machine created by the virtualization platform. The cloud management platform generates the group of security access control policies corresponding to the application according to the IP address of each virtual machine and by using the security profile. Here, after the virtual machine corresponding to the application is created successfully, the IP address of each virtual machine is automatically obtained, and the security access control policy is automatically generated according to the security profile without manual intervention, so that a configuration process of a security access control policy is greatly simplified. Finally, the cloud management platform delivers the group of security access control policies to the corresponding firewall.

Therefore, according to the method provided in the present disclosure, configuration of a security access control policy is integrated into an automation procedure of deploying an application, reducing complexity of deploying a security access control policy, increasing a speed of deploying an application, and implementing automatic deployment of a security access control policy.

In addition, when a preset elastic policy of an application is met, the cloud management platform may automatically adjust a security access control policy corresponding to the application. When any application is migrated, the cloud management platform may automatically reset a security access control policy corresponding to the application. Therefore, the cloud management platform may effectively manage and monitor a security access control policy of the application, so as to ensure network access security.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

According to a first aspect, an aspect of the present disclosure provides a method for deploying a security access control policy, including:

determining, by a cloud management platform according to an application creation instruction, an application template used for an application that needs to be created and a security profile corresponding to the application template;

instructing, by the cloud management platform, a virtualization platform to create, according to the application template, a corresponding virtual machine for each application component in the application, and obtaining an IP address of each virtual machine created by the virtualization platform;

generating, by the cloud management platform, a group of security access control policies corresponding to the application according to the IP address of each virtual machine and by using the security profile; and delivering, by the cloud management platform, the group of security access control policies to a corresponding firewall.

With reference to the first aspect, in a first possible implementation of the first aspect, before the determining, by a cloud management platform according to an application creation instruction, an application template used for an application that needs to be created and a security profile corresponding to the application template, the method further includes:

generating, by the cloud management platform, at least one application template according to a preset application component configuration parameter; and generating, by the cloud management platform, a corresponding security profile for any application template according to a preset security parameter, where the security profile includes at least one security access control policy template.

With reference to the first aspect or the first possible implementation of the first aspect, in a second possible implementation, after the determining, by a cloud management platform according to an application creation instruction, an application template used for an application that needs to be created and a security profile corresponding to the application template, the method further includes:

modifying, by the cloud management platform, the determined security profile according to security configuration information carried in the application creation instruction, and using a modified security profile as a security profile for creating the application.

With reference to the first aspect or any one of the foregoing possible implementations of the first aspect, in a third possible implementation, the method further includes:

when the cloud management platform determines, according to a flexible policy of the application carried in the application creation instruction, that an application component of a first type included in the application meets a scale-out condition in the flexible policy, instructing the virtualization platform to add a new virtual machine corresponding to the application component of a first type, and obtaining an IP address of the virtual machine corresponding to the newly-added application component;

when the cloud management platform determines that the application component of a first type has a corresponding security access control policy, generating a security access control policy for the newly-added application component according to the IP address of the virtual machine corresponding to the newly-added application component and by using a security access control policy template corresponding to the application component of a first type in the security profile; and delivering, by the cloud management platform, the corresponding security access control policy that is configured for the newly-added application component to a corresponding firewall, where the scale-out condition means that when a preset parameter of the application component of a first type in the application reaches a first threshold, a new application component of a first type is added.

With reference to the first aspect or any one of the foregoing possible implementations of the first aspect, in a fourth possible implementation, the method further includes:

when the cloud management platform determines, according to the flexible policy of the application carried in the application creation instruction, that the application component of a first type included in the application meets a scale-in condition in the flexible policy, instructing the virtualization platform to delete a virtual machine corresponding to any application component of a first type; and when the cloud management platform determines that any application component of a first type has a corresponding security access control policy, instructing the firewall to delete the security access control policy corresponding to the application component of a first type, where the scale-in condition means that when the preset parameter of the application component of a first type in the application is less than a second threshold, any application component of a first type is deleted.

With reference to the first aspect or any one of the foregoing possible implementations of the first aspect, in a fifth possible implementation, after the delivering, by the cloud management platform, the group of security access control policies to a corresponding firewall, the method further includes:

when the cloud management platform determines, according to an application migration instruction, that a network environment in which the application is located changes, instructing the virtualization platform to create, according to the application template, a new corresponding virtual machine for each application component in the application, and obtaining an IP address of each new virtual machine;

synchronizing, by the cloud management platform, data in an original virtual machine corresponding to each application component in the application to the new corresponding virtual machine;

deleting the original virtual machine corresponding to each application component in the application, and instructing the firewall to delete the group of security access control policies originally configured for the application;

generating, by the cloud management platform, a group of new security access control policies according to the IP address of the new virtual machine corresponding to each application component and by using the security profile; and delivering, by the cloud management platform, the group of new security access control policies to a corresponding firewall.

According to a second aspect, an aspect of the present disclosure provides a method for deploying a security access control policy, including:

when a cloud management platform determines, according to an application migration instruction, that a network environment in which an application is located changes, instructing a virtualization platform to create, according to an application template corresponding to the application, a new corresponding virtual machine for each application component in the application, and obtaining an IP address of each new virtual machine;

synchronizing, by the cloud management platform, data in an original virtual machine corresponding to each application component in the application to the new corresponding virtual machine;

deleting the original virtual machine corresponding to each application component in the application, and instructing a firewall to delete the group of security access control policies originally configured for the application;

generating, by the cloud management platform, a group of new security access control policies according to the IP address of each new virtual machine corresponding to each application component and by using a security profile corresponding to the application; and delivering, by the cloud management platform, the group of new security access control policies to a corresponding firewall.

With reference to the second aspect, in a first possible implementation of the second aspect, when the cloud management platform determines, according to the application migration instruction, that the network environment in which the application is located changes, the method further includes:

modifying, by the cloud management platform, the security profile corresponding to the application according to security configuration information carried in the application migration instruction, and using a modified security profile as a security profile corresponding to the application.

According to a third aspect, an aspect of the present disclosure provides an apparatus for deploying a security access control policy, including:

a determining unit, configured to determine, according to an application creation instruction, an application template used for an application that needs to be created and a security profile corresponding to the application template;

a creation unit, configured to: instruct a virtualization platform to create, according to the application template determined by the determining unit, a corresponding virtual machine for each application component in the application, and obtain an IP address of each virtual machine created by the virtualization platform;

a generation unit, configured to generate a group of security access control policies corresponding to the application according to the IP address of each virtual machine obtained by the creation unit and by using the security profile determined by the determining unit; and a delivering unit, configured to deliver the group of security access control policies that are generated by the generation unit to a corresponding firewall.

With reference to the third aspect, in a first possible implementation of the third aspect, before the determining unit determines, according to the application creation instruction, the application template used for the application that needs to be created and the security profile corresponding to the application template, the apparatus further includes:

a template generation unit, configured to: generate at least one application template according to a preset application component configuration parameter, and generate a corresponding security profile for any application template according to a preset security parameter, where the security profile includes at least one security access control policy template.

With reference to the third aspect or the first possible implementation of the third aspect, in a second possible implementation, after the determining unit determines, according to the application creation instruction, the application template used for the application that needs to be created and the security profile corresponding to the application template, the apparatus further includes:

a template modification unit, configured to: modify the determined security profile according to security configuration information carried in the application creation instruction, and use a modified security profile as a security profile for creating the application.

With reference to the third aspect or any one of the foregoing possible implementations of the third aspect, in a third possible implementation, the apparatus further includes:

an extending unit, configured to: when determining, according to a flexible policy of the application carried in the application creation instruction, that an application component of a first type included in the application meets a scale-out condition in the flexible policy, instruct the virtualization platform to add a new virtual machine corresponding to the application component of a first type, and obtain an IP address of the virtual machine corresponding to the newly-added application component;

when determining that the application component of a first type has a corresponding security access control policy, generate a security access control policy for the newly-added application component according to the IP address of the virtual machine corresponding to the newly-added application component and by using a security access control policy template corresponding to the application component of a first type in the security profile; and deliver the corresponding security access control policy that is configured for the newly-added application component to a corresponding firewall, where the scale-out condition means that when a preset parameter of the application component of a first type in the application reaches a first threshold, a new application component of a first type is added.

With reference to the first aspect or any one of the foregoing possible implementations of the first aspect, in a fourth possible implementation, the apparatus further includes:

a contraction unit, configured to: when determining, according to the flexible policy of the application carried in the application creation instruction, that the application component of a first type included in the application meets a scale-in condition in the flexible policy, instruct the virtualization platform to delete a virtual machine corresponding to any application component of a first type; and when determining that any application component of a first type has a corresponding security access control policy, instruct the firewall to delete the security access control policy corresponding to the application component of a first type, where the scale-in condition means that when the preset parameter of the application component of a first type in the application is less than a second threshold, any application component of a first type is deleted.

With reference to the first aspect or any one of the foregoing possible implementations of the first aspect, in a fifth possible implementation, after the delivering unit delivers the group of security access control policies that are generated by the generation unit to the corresponding firewall, the apparatus further includes a migration unit; and the migration unit includes:

a creation module, configured to: when determining, according to an application migration instruction, that a network environment in which the application is located changes, instruct the virtualization platform to create, according to the application template, a new corresponding virtual machine for each application component in the application, and obtain an IP address of each new virtual machine;

a synchronization module, configured to synchronize data in an original virtual machine corresponding to each application component in the application to the new corresponding virtual machine;

a deletion module, configured to: delete the original virtual machine corresponding to each application component in the application, and instruct the firewall to delete the group of security access control policies originally configured for the application;

a generation module, configured to generate a group of new security access control policies according to the IP address of the new virtual machine corresponding to each application component and by using the security profile; and a delivering module, configured to deliver the group of new security access control policies to a corresponding firewall.

According to a fourth aspect, an aspect of the present disclosure provides an apparatus for deploying a security access control policy, including:

a creation unit, configured to: when determining, according to an application migration instruction, that a network environment in which an application is located changes, instruct a virtualization platform to create, according to an application template corresponding to the application, a new corresponding virtual machine for each application component in the application, and obtain an IP address of each new virtual machine;

a synchronization unit, configured to synchronize data in an original virtual machine corresponding to each application component in the application to the new corresponding virtual machine;

a deletion unit, configured to: delete the original virtual machine corresponding to each application component in the application, and instruct a firewall to delete the group of security access control policies originally configured for the application;

a generation unit, configured to generate a group of new security access control policies according to the IP address of each new virtual machine corresponding to each application component and by using a security profile corresponding to the application; and a delivering unit, configured to deliver the group of new security access control policies to a corresponding firewall.

With reference to the fourth aspect, in a first possible implementation of the fourth aspect, when determining, according to the application migration instruction, that the network environment in which the application is located changes, the apparatus further includes:

a template modification unit, configured to: modify the security profile corresponding to the application according to security configuration information carried in the application migration instruction, and use a modified security profile as a security profile corresponding to the application.

Beneficial effects of the present disclosure are as follows:

The cloud management platform determines, according to the application creation instruction, the application template used for the application that needs to be created and the security profile corresponding to the application template. Because a pre-configured application template and a security profile corresponding to the application template are used for deploying an application, efficiency of deploying an application is greatly improved. The cloud management platform instructs the virtualization platform to create, according to the application template, the corresponding virtual machine for each application component in the application, and obtains the IP address of each virtual machine created by the virtualization platform. The cloud management platform generates the group of security access control policies corresponding to the application according to the IP address of each virtual machine and by using the security profile. After the virtual machine corresponding to the application is created successfully, the IP address of each virtual machine is automatically obtained, and the security access control policy is automatically generated according to the security profile without manual intervention, so that a configuration process of a security access control policy is greatly simplified. Finally, the cloud management platform delivers the group of security access control policies to the corresponding firewall. Therefore, according to the method provided in the present disclosure, configuration of a security access control policy is integrated into an automation procedure of deploying an application, reducing complexity of deploying a security access control policy, increasing a speed of deploying an application, and implementing automatic deployment of a security access control policy. In addition, when a preset elastic policy of an application is met, the cloud management platform may automatically adjust a security access control policy corresponding to the application. When any application is migrated, the cloud management platform may automatically reset a security access control policy corresponding to the application. Therefore, the cloud management platform may effectively manage and monitor a security access control policy of the application, so as to ensure network access security.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method for deploying a security access control policy by a cloud management platform, wherein the method comprises:

determining, based on an application creation instruction received from a cloud user, an application template of an application and a security profile corresponding to the application template, wherein the application template comprises a first quantity of application components, wherein the application components comprise different servers, wherein the security profile comprises a second quantity of security access control policies, wherein the second quantity comprises one or more security access control policies, wherein the second quantity is less than the first quantity, and wherein each of the one or more security access control policies corresponds to different combinations of the application components;

adding, to the security profile based on the application creation instruction, one or more security access control policies such that a final quantity of security access control policies equals the first quantity, wherein each of the application components has a corresponding one of the security access control policies, and wherein each of the security access control policies comprises an empty entry for a cluster listening address;
instructing a virtualization platform to create, according to the application template, a virtual machine for each application component in the application, wherein each of the virtual machines comprises an Internet Protocol (IP) address;
obtaining, in response to the virtual platform creating the virtual machines, the IP address of each virtual machine created by the virtualization platform;
generating, after the virtualization platform obtains the IP address of each virtual machine and based on the security profile, a group of security access control policies corresponding to the IP address of each virtual machine by the cloud management platform adding, without manual intervention, the IP address of each virtual machine to the empty entry for the cluster listening address in each of the security access control policies; and
delivering the group of security access control policies to a firewall.

2. The method of claim 1, further comprising, before determining the application template and the security profile:
generating the application template according to a preset application component configuration parameter; and
generating the security profile according to a preset security parameter, wherein the security profile comprises at least one security access control policy.

3. The method of claim 1, wherein before instructing the virtualization platform, the method further comprises:
modifying the security profile to create a modified security profile according to security configuration information carried in the application creation instruction; and
using the modified security profile as the security profile of the application.

4. The method of claim 1, further comprising:
determining, according to a flexible policy of the application carried in the application creation instruction, that an application component of a first type comprised in the application meets a scale-in condition in the flexible policy, wherein the scale-in condition comprises a preset parameter of the application component of the first type being less than a second threshold;
instructing the virtualization platform to delete a virtual machine corresponding to the application component of the first type;
determining that the application component of the first type has a corresponding security access control policy; and
instructing the firewall to delete the corresponding security access control policy.

5. The method of claim 1, wherein after delivering the group of security access control policies, the method further comprises:
determining, according to an application migration instruction, that a network environment in which the application is located changes;
instructing the virtualization platform to create, according to the application template, a new corresponding virtual machine for each application component in the application;
obtaining an IP address of each new virtual machine;
synchronizing data in an original virtual machine corresponding to each application component to the new corresponding virtual machine;
deleting the original virtual machine corresponding to each application component;
instructing the firewall to delete the group of security access control policies;
generating, based on the security profile, a group of new security access control policies according to the IP address of the new virtual machine corresponding to each application component; and
delivering the group of new security access control policies to the firewall.

6. The method of claim 1, wherein the application template identifies each application component in the application.

7. The method of claim 1, further comprising:
determining, according to a flexible policy of the application carried in the application creation instruction, that an application component of a first type comprised in the application meets a scale-out condition in the flexible policy, wherein the scale-out condition comprises a preset parameter of the application component of the first type reaching a first threshold;
instructing the virtualization platform to add a new virtual machine corresponding to the application component of the first type when the scale-out condition is met;
obtaining an IP address of the new virtual machine;
determining that the application component of the first type has a corresponding security access control policy;
generating a security access control policy for the application component of the first type according to the IP address of the new virtual machine based on a corresponding security access control policy of the application component of the first type; and
delivering the corresponding security access control policy to the firewall.

8. A method for deploying a security access control policy by a cloud management platform, wherein the method comprises:
determining, according to an application migration instruction, that a network environment in which an application is located changes, wherein the application comprises a first quantity of application components, and wherein the application components comprise different servers;
instructing a virtualization platform to create, according to an application template corresponding to the application, a new virtual machine for each application component in the application, wherein each of the new virtual machines comprises an Internet Protocol (IP) address;
obtaining the IP address of each new virtual machine;
synchronizing, by the cloud management platform, data in an original virtual machine corresponding to each application component in the application to the new virtual machine for each application component;
deleting the original virtual machine corresponding to each application component;
instructing a first firewall to delete a group of security access control policies originally configured for the application;
generating, after the cloud management platform obtains the IP address of each new virtual machine and based on a security profile corresponding to the application, a group of new security access control policies according to the IP address of each new virtual machine by adding, without manual intervention, the IP address of each new virtual machine to an empty entry for a cluster listening address in each of the new security access control policies, wherein the security profile comprises a second quantity of the new security access control policies, wherein the second quantity comprises one or more security access control policies, wherein the second quantity is less than the first quantity, and wherein each of the one or more security access control policies corresponds to different combinations of the application components;

determining, based on the application migration instruction a second firewall corresponding to the changed network environment; and delivering the group of new security access control policies to the second firewall.

9. The method of claim 8, further comprising:

modifying the security profile corresponding to the application to create a modified security profile according to security configuration information carried in the application migration instruction; and using the modified security profile as the security profile corresponding to the application.

10. The method of claim 8, wherein the application template identifies each application component in the application.

11. An apparatus for deploying a security access control policy, wherein the apparatus comprises:

a memory comprising instructions;

a processor, configured to execute the instructions, wherein the instructions when executed by the processor cause the processor to:

determine, according to an application creation instruction from a cloud user, an application template of an application and a security profile corresponding to the application template, wherein the application template comprises a first quantity of application components, wherein the application components comprise different servers, wherein the security profile comprises a second quantity of security access control policies, wherein the second quantity comprises one or more security access control policies, wherein the second quantity is less than the first quantity, and wherein each of the one or more security access control policies corresponds to different combinations of the application components;

add, to the security profile based on the application creation instruction, one or more security access control policies such that a final quantity of security access control policies equals the first quantity, wherein each of the application components has a corresponding one of the security access control policies, and wherein each of the security access control policies comprises an empty entry for a cluster listening address;

instruct a virtualization platform to create, according to the application template, a virtual machine for each application component in the application, wherein each of the virtual machines comprises an Internet Protocol (IP) address;

obtain, in response to the virtual platform creating the virtual machines, the IP address of each virtual machine created by the virtualization platform;

generate, after the virtualization platform obtains the IP address of each virtual machine and based on the security profile, a group of security access control policies corresponding to the IP address of each virtual machine by the apparatus adding, without manual intervention, the IP address of each virtual machine to the empty entry for the cluster listening address in each of the security access control policies; and deliver the group of security access control policies to a firewall.

12. The apparatus of claim 11, wherein the instructions further cause the processor to:

generate the application template according to a preset application component configuration parameter; and generate the security profile according to a preset security parameter, wherein the security profile comprises at least one security access control policy.

13. The apparatus of claim 11, wherein the instructions further cause the processor to:

modify the security profile to create a modified security profile according to security configuration information carried in the application creation instruction; and use the modified security profile as the security profile of the application.

14. The apparatus of claim 11, wherein the instructions further cause the processor to:

determine, according to a flexible policy of the application carried in the application creation instruction, that an application component of a first type comprised in the application meets a scale-in condition in the flexible policy, wherein the scale-in condition comprises a preset parameter of the application component of the first type being less than a second threshold;

instruct the virtualization platform to delete a virtual machine corresponding to the application component of the first type;

determine that the application component of the first type has a corresponding security access control policy; and instruct the firewall to delete the security access control policy corresponding to the application component of the first type.

15. The apparatus of claim 11, wherein the instructions further cause the processor to:

determine, according to an application migration instruction, that a network environment in which the application is located changes;

instruct the virtualization platform to create, according to the application template, a new corresponding virtual machine for each application component in the application;

obtain an IP address of each new virtual machine;

synchronize data in an original virtual machine corresponding to each application component to the new corresponding virtual machine;

delete the original virtual machine corresponding to each application component;

instruct the firewall to delete the group of security access control policies;

generate, based on the security profile, a group of new security access control policies according to the IP address of the new virtual machine corresponding to each application component; and deliver the group of new security access control policies to the firewall.

16. The apparatus of claim 11, wherein the application template identifies each application component in the application.

17. The apparatus of claim 11, wherein the instructions further cause the processor to:

determine, according to a flexible policy of the application carried in the application creation instruction, that an application component of a first type comprised in the application meets a scale-out condition in the flexible policy, wherein the scale-out condition comprises a preset parameter of the application component of the first type reaching a first threshold;

instruct the virtualization platform to add a new virtual machine corresponding to the application component of the first type when the scale-out condition is met;

obtain an IP address of the new virtual machine;

determine that the application component of the first type has a corresponding security access control policy;

generate a security access control policy for the application component of the first type according to the IP address of the new virtual machine based on a corresponding security access control policy of the application component of the first type; and deliver the corresponding security access control policy to the firewall.

18. An apparatus for deploying a security access control policy, wherein the apparatus comprises:
a memory comprising instructions; and
a processor coupled to the memory and configured to execute the instructions, wherein the instructions when executed cause the processor to:
determine, according to an application migration instruction, that a network environment in which an application is located changes, wherein the application comprises a first quantity of application components, and wherein the application components comprise different servers;
instruct a virtualization platform to create, according to an application template corresponding to the application, a new virtual machine for each application component in the application, wherein each of the new virtual machines comprises an Internet Protocol (IP) address;
obtain the IP address of each new virtual machine;
synchronize data in an original virtual machine corresponding to each application component in the application to the new virtual machine for each application component;
delete the original virtual machine corresponding to each application component;
instruct a first firewall to delete a group of security access control policies originally configured for the application;
generate, after the cloud management platform obtains the IP address of each new virtual machine and based on a security profile corresponding to the application, a group of new security access control policies according to the IP address of each new virtual machine by the apparatus adding, without manual intervention, the IP address of each new virtual machine to an empty entry for a cluster listening address in each of the new security access control policies, wherein the security profile comprises a second quantity of the new security access control policies, wherein the second quantity comprises one or more security access control policies, wherein the second quantity is less than the first quantity, and wherein each of the one or more security access control policies corresponds to different combinations of the application components;
determine, based on the application migration instruction a second firewall corresponding to the changed network environment; and
deliver the group of new security access control policies to the second firewall.

19. The apparatus according to claim 18, wherein the instructions further cause the processor to:
modify the security profile corresponding to the application to create a modified security profile according to security configuration information carried in the application migration instruction; and
use the modified security profile as the security profile corresponding to the application.

20. The apparatus of claim 18, wherein the application template identifies each application component in the application.

\* \* \* \* \*